United States Patent [19]
Linderman

[11] Patent Number: 6,167,330
[45] Date of Patent: Dec. 26, 2000

[54] DYNAMIC POWER MANAGEMENT OF SYSTEMS

[75] Inventor: Mark H. Linderman, Rome, N.Y.

[73] Assignee: The United States of America as represented by the Secretary of the Air Force, Washington, D.C.

[21] Appl. No.: 09/074,985

[22] Filed: May 8, 1998

[51] Int. Cl.[7] .............................. G05D 3/12; G06F 11/30
[52] U.S. Cl. ........................................... 700/295; 713/300
[58] Field of Search ................................... 700/295, 297, 700/299; 713/300, 320, 323, 324, 340; 714/22, 35

[56] References Cited

U.S. PATENT DOCUMENTS

| | | | |
|---|---|---|---|
| 4,639,864 | 1/1987 | Katzman et al. | 364/200 |
| 5,339,426 | 8/1994 | Aoshima | 717/1 |
| 5,721,937 | 2/1998 | Kurihara et al. | 713/300 |
| 5,784,636 | 7/1998 | Rupp | 712/3 |
| 5,811,890 | 9/1998 | Hamamoto | 307/66 |
| 5,825,674 | 10/1998 | Jackson | 713/321 |

*Primary Examiner*—Thomas C. Lee
*Assistant Examiner*—Nitin Patel
*Attorney, Agent, or Firm*—Harold L. Burstyn; Joseph A. Mancini; Luis Ortiz

[57] ABSTRACT

A method and system for power management of components within a system by introducing low-level instructions, such as NOPS, delay loops, and sleep modes, into the instruction sequences within logical components of the system, thereby allowing the system to maintain desirable power dissipation over a given time interval. Through employment of a control mechanism, a system can interrupt itself periodically to determine if the power dissipation must be limited and to what extent. A system can determine if and by how much it must limit its power by polling external components. The method may be implemented by a controller that intelligently manages power dissipation of components through selective manipulation of computer operations by selected components. Controll of power dissipation for the selected components is intelligently based on overall system performance requirements. Furthermore, a plurality of sensors can measure power dissipation of a plurality of components in the system and cause the controller to selectively manipulate those components that require power management. In a proactive approach, power dissipation for the plurality of managed components can be controlled based on known power characteristics for the selected components without necessarily monitoring the power dissipation of the system through sensors. In a reactive approach, a plurality of sensors that measure power dissipation in the system can cause the controller to selectively manipulate components requiring power management. The system can employ a combination of proactive and reactive approaches to power management.

9 Claims, 5 Drawing Sheets

DYNAMIC POWER MANAGEMENT OF SYSTEMS

STATEMENT OF GOVERNMENT INTEREST

The U.S. Government has certain rights to this invention. The invention described herein may be manufactured and used by or for the Government for governmental purposes without the payment of any royalty thereon.

FIELD OF THE INVENTION

The present invention relates to thermal monitoring and cooling of systems and, more particularly, to a dynamic power management system having capabilities of measuring or estimating the power dissipation of components and a controller that can manage the power dissipation of components within the system.

BACKGROUND OF THE INVENTION

Development in the semiconductor industry has resulted in increasingly compact and complex system circuitry. There is an ever-increasing challenge to prevent thermal breakdown in components that is due to inadequate power management. Thermal stress puts a lid on processor clock rates, reduces component life, and results in costly maintenance requirements and cooling applications. Several attempts have been made to address thermal power management requirements.

Generally, a thermal management system may have zero or more sensors. The sensor for a given component or components either measures power dissipation or consumption or derives it from other measurable quantities such as temperature, current, voltage, or pressure. In addition, a system must know the desired amount of average power dissipation so that it can compare this amount against the measured power dissipation to exert some form of thermal control. This invention provides several methods of controlling the average power dissipation of an electronic component.

The period of time over which the power is averaged is a critical factor in determining the most appropriate method to use. For example, if the primary concern is heat dissipation, then it may be reasonable to average the power for many milliseconds or even full seconds. However, if the primary concern is current spikes, then the power may be averaged over only 100 nanoseconds or less. While many methods discussed here are applicable to the former situation, the latter is much more difficult.

U.S. Pat. No. 5,477,076 issued Dec. 19, 1995, and U.S. Pat. No. 5,376,819 issued Dec. 27, 1994, both to Gay et al., disclose an integrated circuit that implements a thermal circuit on a chip for measuring temperature of an operating integrated circuit die with only one dedicated integrated circuit pin. A second integrated circuit pin is connected directly to other circuitry on the integrated circuit and is used by the other circuitry at the same time that the integrated circuit die temperature is measured. In one form, the second integrated circuit pin is a ground terminal. Error voltages coupled to the ground terminal may be removed from the temperature calculation by an external differential amplifier.

U.S. Pat. No. 5,230,564 issued Jul. 27, 1993 and U.S. Pat. No. 5,281,026 issued Jan. 25, 1994, both to Bartilson et al., disclose a monitoring system for air-cooled printed circuit boards that utilizes temperature sensors having thermal diodes embedded directly into the integrated circuits. The thermal diodes are part of the fully-functioning integrated circuit. As they are driven by voltages on the board, they require no added power sources. The thermal diode has a voltage inversely proportional to the temperature. It can be calibrated to convert a given voltage into a given temperature. This conversion can be utilized by a logic controller to monitor and control cooling. Pressure sensors are also used with the temperature sensors to monitor air pressure along the ducts leading to the printed circuit boards. Pressure sensors are also driven by voltages from the board. They have an amplification circuit to increase the signal. The pressure reading can also be utilized by a logic controller for controlling and monitoring the cooling of the boards.

U.S. Pat. No. 5,213,416 issued May 25, 1993, to Neely et al. discloses a novel on-chip temperature sensing circuit that includes a differential voltage source that comprises a plurality of branches, each of which has a temperature-sensitive transistor. The output from the differential voltage source is coupled to the high-gain differential amplifier whose outputs are connected to a second-stage differential amplifier. One of the branches of the second-stage differential amplifier is coupled to a high-gain transistor amplifier that is in turn connected to an output pin on the semiconductor chip, so that the signal at the output pin is a noise-tolerant voltage indication of the temperature of the semiconductor chip, which may be monitored during actual on-line operations. The two differential amplifiers may be coupled to provide a hysteresis feedback loop and rapid switching of the second differential amplifier.

U.S. Pat. No. 5,639,163 issued on Jun. 17, 1997, to Davidson et al. discloses a pair of on-chip thermal sensing diodes formed together and interconnected with a common cathode to form a differential sensing pair. A pair of precision resistors external to the chip generates two constant currents, one for each diode, with a ratio on the order of 100 to 1. The precision resistor values are selected so that variations about the nominal values of metal and via resistances between the diode contacts and the chip contact pads are negligible compared to the precision resistor values. Leads, connected respectively to two pads on the chip, couple a differential output of the anode voltages of the diode pair to the input of a high-impedance amplifier.

U.S. Pat. No. 5,660,474 issued Aug. 26, 1997, to Kurihara discloses a temperature detecting circuit that generates an output signal that depends on temperature and is unaffected by variations in power supply voltage. The temperature-detecting circuit provides a diode that generates across two terminals a voltage that depends on the temperature, a first resistor connected to the anode of this diode, a second resistor with one end grounded, first and second transistors for applying a fixed voltage to the first and second resistors, third and fourth transistors supplied by the current flowing through the first and second resistors, fifth and sixth transistors to the bases of which the emitter currents of the third and fourth transistors are applied, and seventh and eighth transistors to the bases of which the emitter currents of the fifth and sixth transistors are applied. The output current varies with the temperature but not with the power supply voltage.

More recently, another hardware thermal sensing/ monitoring system was introduced by Maxim Integrated Products of Sunnyvale California ("IC keeps tabs on hotter CPUs," Electronic Engineering Times Feb. 2, 1998,). The Maxim component reads temperatures at the surface of the die by measuring temperature-induced changes in the forward voltage across a diode or transistor junction, then it linearizes and converts the voltage changes to a serial digital signal. The Maxim component does not require special temperature sensors or physical attachment to heat sinks. A reading through a pn diode or transistor is taken from the chip itself through voltage measurements across two chip pins. Base-emitter voltage is measured across a diode or transmitter on the CPU die. Two controlled-current sources force current into pinouts provided at the CPU, then read the voltage difference across them. An on-chip AID converter makes this a digital reading, which is fed concurrently to an SMBus transceiver and a bank of internal registers. These registers can also store reference values and can trigger external shutdown or pulse-skipping mechanisms for the processor.

In addition to the previous hardware implementations there are numerous methods of reducing power dissipation of a processor. One means used in the art is a "sleep mode" whereby the processor is suspended in a low power mode awaiting a "time ouf" or "interrupt" to "wake up." Another means is "pulse skipping" whereby a processors clock that is typically a uniform, periodic train of pulses is modified to occasionally omit a pulse.

None of the prior-art solutions provide for a coordinated power management system for multiple components. What is needed is a system or method of providing thermal control to a plurality of processors or components intelligently based on overall system processing needs. Such a system is also desirable when thermal control can be achieved without a major modification of existing circuitry or a large departure from system design. Furthermore, a system or method of monitoring thermal behaviors of plural processors or components would be a desirable enhancement in such a control system. Features of the present invention are presented that achieve thermal management, monitoring, and control in a manner that addresses the needs of complex systems. With the present invention, a flexible control system for intelligent power management of numerous processors is provided.

SUMMARY OF THE INVENTION

The present invention allows a system or components of arbitrary complexity to maintain average power dissipation to within a given upper bound over a time interval. Such a concept applies to both mechanical and electrical systems. The system of the invention is comprised of a plurality of power management controllers, each of which manages a plurality of components. The controller(s) intelligently control power dissipation for the managed components individually based on overall system computing and power requirements. Through the employment of a control mechanism, the system may interrupt itself to determine if the power dissipation must be limited. The intelligent system of the present invention, through its control mechanism, can, by polling external components, further determine if and how much it must limit its power. The system also determines if and how much it must limit its power by monitoring its own average power consumption through a sensor and comparing this to a desirable consumption. In a proactive approach, control of power dissipation for the plurality of managed components may be based on known power characteristics for the selected components without necessarily monitoring the power dissipation of the whole system. In a reactive approach, a plurality of sensors that measure power dissipation in the system may also be employed to cause the controller to manipulate selectively only those components that require power management. The system can also employ a combination of proactive and reactive approaches to power management.

In an electronic and computer system, electrical power can be managed within logical system components through the introduction of low level operations such as "NO Operation" instructions (NOPs), delay loops, or periods of time in which the processsor in suspended in a sleep mode into a sequence of operations. These operations are generally referred to throughout this disclosure as "NOPs." Introducing NOPs/loops/sleep modes into a system's programming operations does not require additional hardware or sensor feedback when system operation can be anticipated. This invention may, however, be comprised of a controller that intelligently alters the power dissipation of components within the system through the introduction of NOP instructions or manipulation of other computer operations. The system can include a plurality of sensors that measure the power dissipation of several components and cause the controller to selectively interrupt or slow down given components. The interruption or. slowing may also be intelligently based on overall system requirements.

Described is a method of managing average power dissipation within a computer system for a sequence of operations, comprising the steps of determining a number of NOPs required to bring power dissipation to an effective level; and introducing the number of NOPs into the sequence of operations. This method increases the period over which the sequence is executed, in which the average power dissipation by the NOPs is less than that of other instructions and decreases average power dissipation for an entire sequence of instructions. With this method, systems interrupt their normal sequence of operations and allow the execution of operations that alter power dissipation.

Many features and advantages of the present invention will be readily apparent to one skilled in the pertinent art from the following detailed description of the preferred embodiments of the invention and the related drawings.

DETAILED DESCRIPTION OF THE PREFERRED EMBODIMENT

Work has two principal components: dynamic work and static work. Dynamic work performed depends upon the operation being performed. Static work is performed regardless of the operation. Total work is the sum of these two components:

$$W = W_D + W_S.$$

The static work $W_S$ results from static power dissipation, denoted S. For a sequence of N operations (numbered 1 to N), the dynamic work performed by the $i^{th}$ operation is $W_D(i)$. The period over which the operations are performed is denoted by T. Therefore the total work performed in executing the N operations is $$W = \left(\sum_{i=1}^{N} W_D(i)\right) + ST$$

Average power over a period T is the work performed over the period T divided by T.

$$P_{avg} = \frac{\left(\sum_{i=1}^{N} W_D(i)\right) + ST}{T} = \frac{\left(\sum_{i=1}^{N} W_D(i)\right)}{T} + S$$

If the period over which the sequence of N operations performed is increased from T to $T+T_{stall}$, then average power dissipation will decrease.

An electronic system is comprised of C components. The $i^{th}$ component has a maximum power dissipation of $P_{high}(i)$. By exercising control over a component, its maximum power dissipation can be guaranteed not to exceed $P_{low}(i)$. Therefore the power dissipation of the system $P_{system}$ is:

$$P_{system} \leq \sum_{i=1}^{C} P_{high}(i)$$

But by means of this invention, the power may be guaranteed to be:

$$P_{system} \leq \sum_{i=1}^{C} P_{low}(i)$$

If the power dissipation of the $i^{th}$ component is not controllable, then $P_{low}(i)=P_{high}(i)$.

Depending upon actual implementation of the power control mechanism, it may be possible to limit the maximum power dissipation to some level $P_{desired}$:

$$\sum_{i=1}^{C} P_{low}(i) \leq P_{desired} \leq \sum_{i=1}^{C} P_{high}(i)$$

This system allows each component to be controlled independently of or in concert with other components.

This thermal management system may have zero or more sensors. It may also contain discrete circuit elements or a collection of sub-components employed throughout a managed system. The sensor for a given component may use the outputs of other sensors to measure or estimate power dissipation. In addition, the sensor must know the desired amount of average power dissipation so that it can compare this against the measured or estimated power dissipation. The desired power dissipation may be determined 'locally' by the sensor itself, by another sensor, by the system, or by any combination of these means. Furthermore, each controller may have a different desired power dissipation.

For example, a computer comprised of three boards may be limited to 3 Amps of electricity at 100 Volts. Therefore the maximum power dissipation is limited to 300 Watts. This is a system-level constraint that may be monitored by measuring the current into the computer. However, because of the cooling capacity of the enclosure, each board is limited to 120 Watts. This is a component-level constraint that can be measured by monitoring the temperature of the board. Furthermore, each board has 4 processors, each of which may dissipate 40 Watts. The desired power dissipation of a component may depend upon the behavior of its elements or sub-components and upon constraints imposed by other components in the system. The desired power dissipation may also vary over time.

The first embodiment of the thermal control system of the present invention is focused on logical system operation or instruction manipulation within a microprocessor-based system. Most microprocessors have an instruction (generally referred to as a NOP or No-Operation) that performs little or no useful work. Historically, these instructions have been used in computing when no useful work needs to be performed (such as an unusable branch delay slot) or when a delay is necessary for timing purposes (when useful work could otherwise be performed). The insertion of a NOP, delay loops, or a period of suspension in sleep mode (herein all generally referred to as "NOPs") into a sequence of operations will increase the period of time over which the sequence is executed. Because the NOP performs little or no work, the power dissipation of the processor is typically reduced during a NOP relative to many other operations. Therefore, if the average power dissipation by the NOP is less than that of the other operations, then the average power dissipation for the entire sequence of operations will decrease. Assume that K NOPs are inserted into the sequence of N operations and that each NOP requires $T_{NOP}$ time and consumes $W_{NOP}$ of energy. Then:

$$P_{avg} = \frac{\left(\sum_{i=1}^{N} W_D(i)\right) + KW_{NOP} + S(T + KT_{NOP})}{T + KT_{NOP}}$$

$$= \frac{\left(\sum_{i=1}^{N} W_D(i)\right) + KW_{NOP}}{T + KT_{NOP}} + S$$

If $KW_{NOP}$ is small relative to the work for performing the other operations then:

$$P_{avg} = \frac{\left(\sum_{i=1}^{N} W_D(i)\right)}{T + KT_{NOP}} + S$$

The insertion of NOPs in the microprocessor is typically performed by the compiler for compiled code or in some instances by the programmer in assembly code. If the desired power dissipation is known at compile time, and the compiler for the system can approximate the power dissipation of a processor based upon the instructions it is executing, then the compiler may use this method of controlling average power by periodically stalling the processor to reduce the average power dissipation.

Interrupting the processor is another method of allowing the processor to exercise NOPs to cool itself down. Such an interruption could be tied to an external signal or event, but it may also occur internally through timed interrupts or programming. Interruption could be in response to a signal from a temperature or current sensor. Microprocessors typically can be interrupted by an external component and forced to perform some action. To reduce the power consumption of a microprocessor-based component, the processor may be interrupted by a sensor input and then forced to perform a number of NOPs or other low-power dissipation operations. The number of operations and the frequency of the interrupts may depend upon the amount by which the power is to be reduced and the number of sensor-triggered interrupts to the processor.

Through employment of a control mechanism, a microprocessor may be able to interrupt itself periodically to determine if the power dissipation must be limited and to what extent. This is analogous to the embodiment of introducing NOPs after an interruption, except that the interruption and NOP sequence is initiated by the processor itself, rather than by an external controller. There are a number of ways in which the processor may determine if it must limit its power and by how much. It may:

1. Poll some external component (perhaps with a data message transmitted over the normal message-passing fabric of the computer) to determine the number of NOPs or wait states that the processor must execute.
2. Monitor its own average power consumption through a sensor and compare it to the desired consumption. Either or both of these quantities may be stored digitally in a register or by means of a voltage or current. The average power consumption can be monitored by measuring the temperature of the component since temperature is related to power dissipation.
3. An external component can record the desired level of power reduction in a manner that is directly accessible to the processor (such as in an internal register or a directly accessible external register).
4. Use dedicated signals that are controlled by an external logical component or processor.

In systems that employ numerous processors, an intelligent control mechanism would be preferred, in order to ensure robust system operation that meets desired performance objectives. The control mechanism can interrupt microprocessors that depend on unavailable data from another microprocessor in a complex system or slow down (and thus cool down) a sequence of instructions whose result is not needed as fast as they could otherwise be computed.

Figure 1:
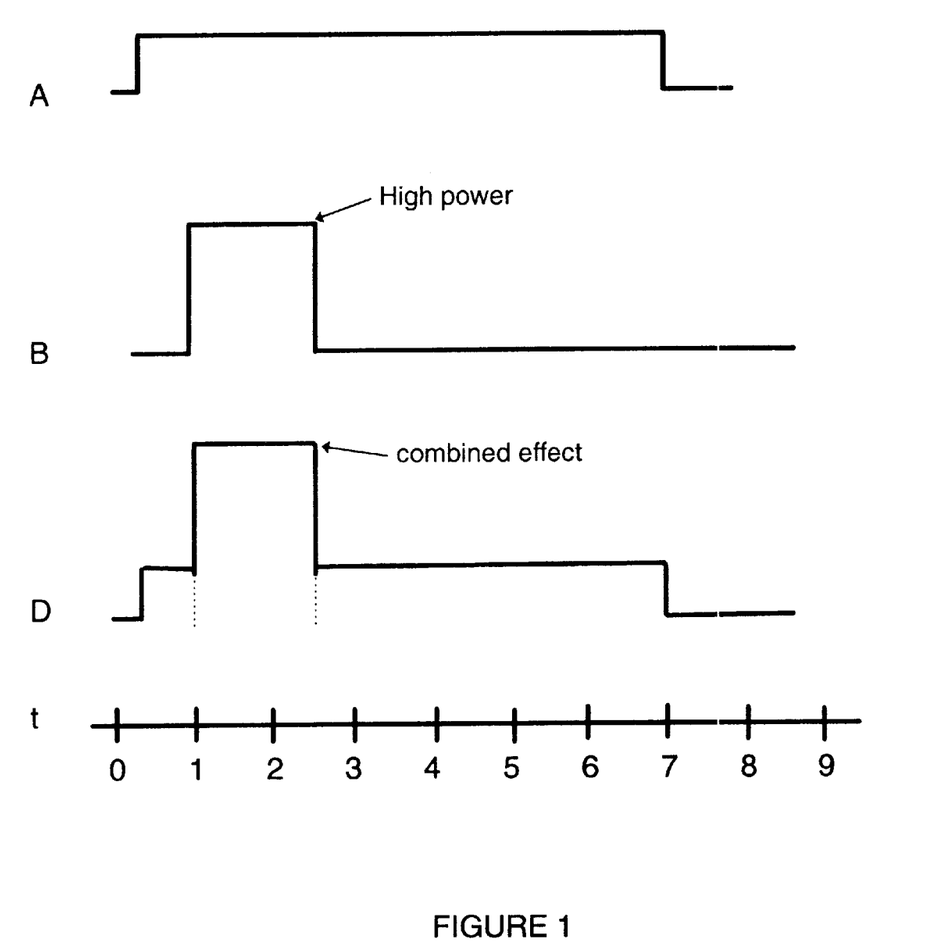
FIG. 1 provides a waveform diagram that illustrates the power dissipation of two independent processes A and B and the effect of their combined power dissipation on a system over time.
Figure 2:
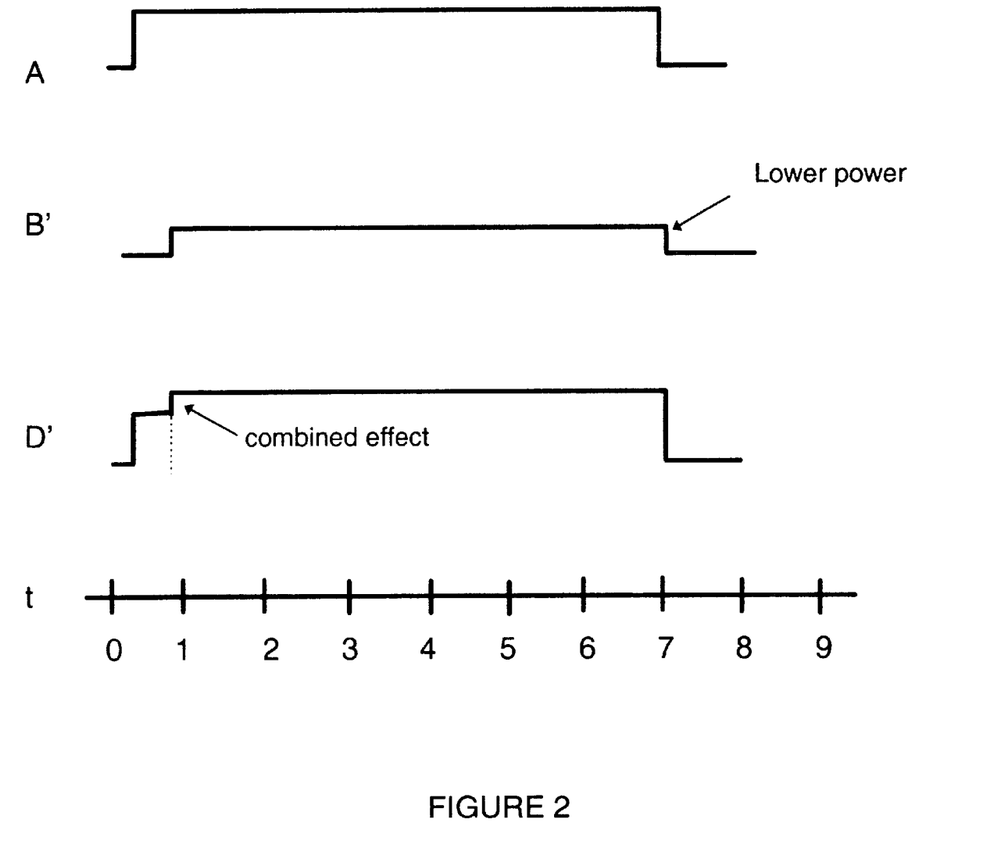
FIG. 2 provides a waveform diagram that illustrates processes A and B, where process B is modified to enhance the combined power dissipation effects of A and B over time.

Referring to FIG. 1, a timing diagram shows three waveforms that represent the power dissipation over time of two independent sequences of operations A and B, which may be handled by different system components, and the total dissipation D (note that time is the horizontal axis, and power is the height of each waveform). For example, in the figure, process A is shown to be shorter than process B between times 1 and 2, indicating that process A is consuming less average power than process B. Assume that the results of A and B are required by the system before a subsequent task C (not shown) can begin. In this case, process A is shown to stretch horizontally for a duration almost four times that of Process B. A power control system, recognizing the dependency of task C on the results from tasks A and B, can stretch B, as indicated in FIG. 2, waveform B', in order to closely match the processing time of Processor A, thus resulting in lower power consumption of the system as indicated by waveform D'. Note that the total power dissipation between times 1 and 2 is lower for D' (FIG. 2) than for D (FIG. 1), because the work of task B was spread over a longer period of time resulting in a lower combined effect on the system's power budget. This control system is therefore capable of intelligently allocating a power budget while still meeting performance objectives.

Figure 3:
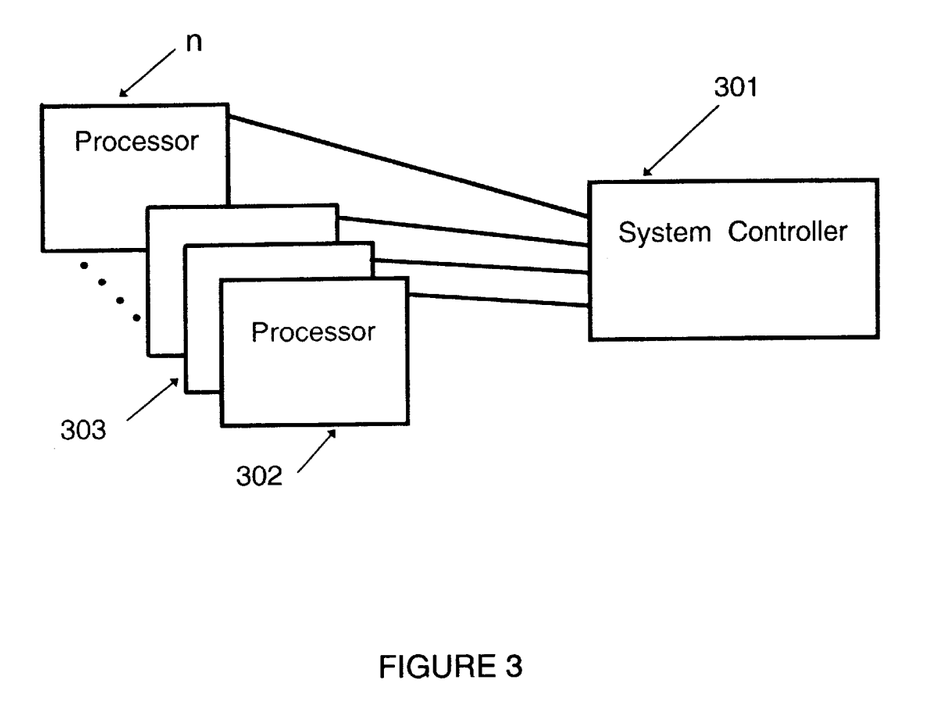
FIG. 3 illustrates one embodiment of the present invention, where a system controller manages multiple processing components.
Figure 4:
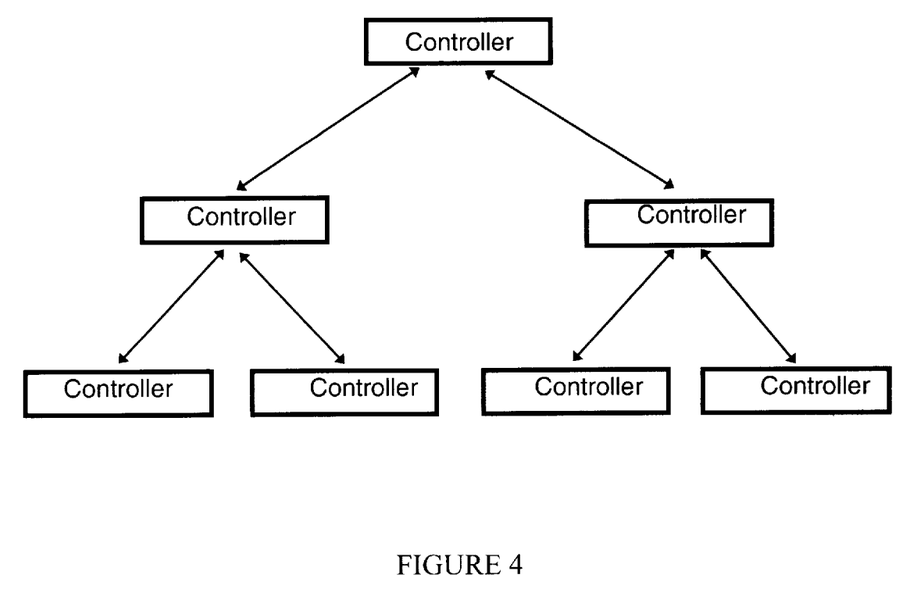
FIG. 4 illustrates a first topology for the invention, where controllers are configured in a hierarchical fashion.
Figure 5:
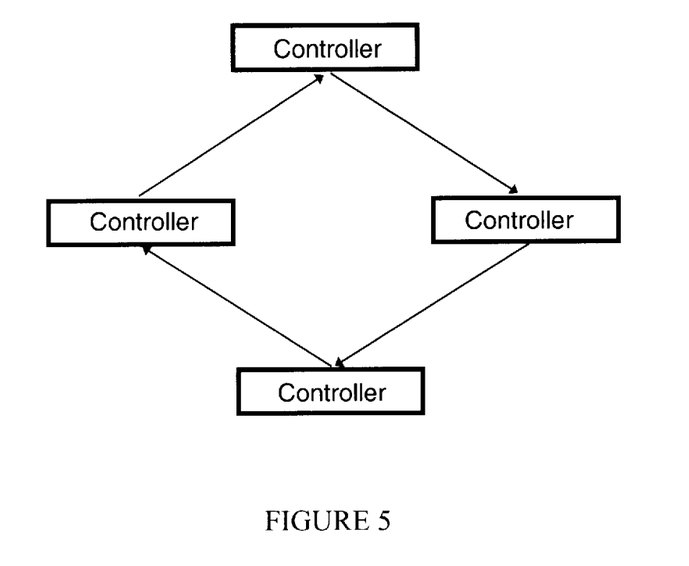
FIG. 5 illustrates a daisy-chain configuration, where each controller shares data in a rotational fashion.
Figure 6:
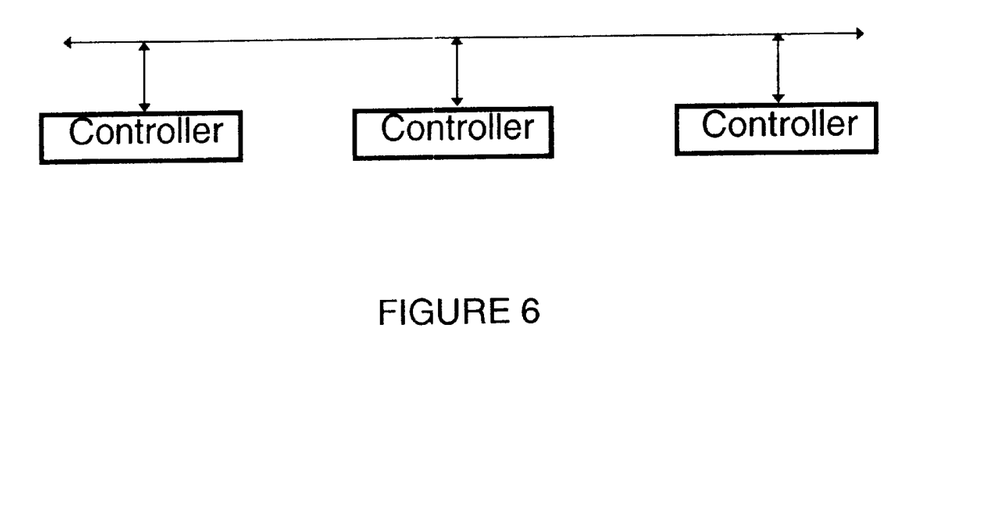
FIG. 6 illustrates a bused configuration, which would be typical of a networked computing environment. The topology of the controllers can depend on the topology of the system.

Referring to FIG. 3, a system architecture has a system controller 301. The system architecture also has multiple processing components 302, 303, . . . n, which are monitored and managed by controller 301. The processing components 302 through n could represent a plurality of system boards, each with a resident power management controller (not shown) and containing multiple processors. In a configuration representing monitored processors on circuit boards controlled by the single system controller 301, controller 301 is responsible for checking the computing status of individual processors and components. In a configuration having several system controllers that communicate with each other, many configurations are possible. Referring to FIG. 4, a first topology configures controllers in a hierarchical fashion. Referring to FIG. 5, a daisy chain configuration has each controller sharing data in a rotational fashion. Referring to FIG. 6, a bused configuration is typical of networked computing environments. It is clear that the topology of the controllers will depend on the topology of the system.

Figure 7:
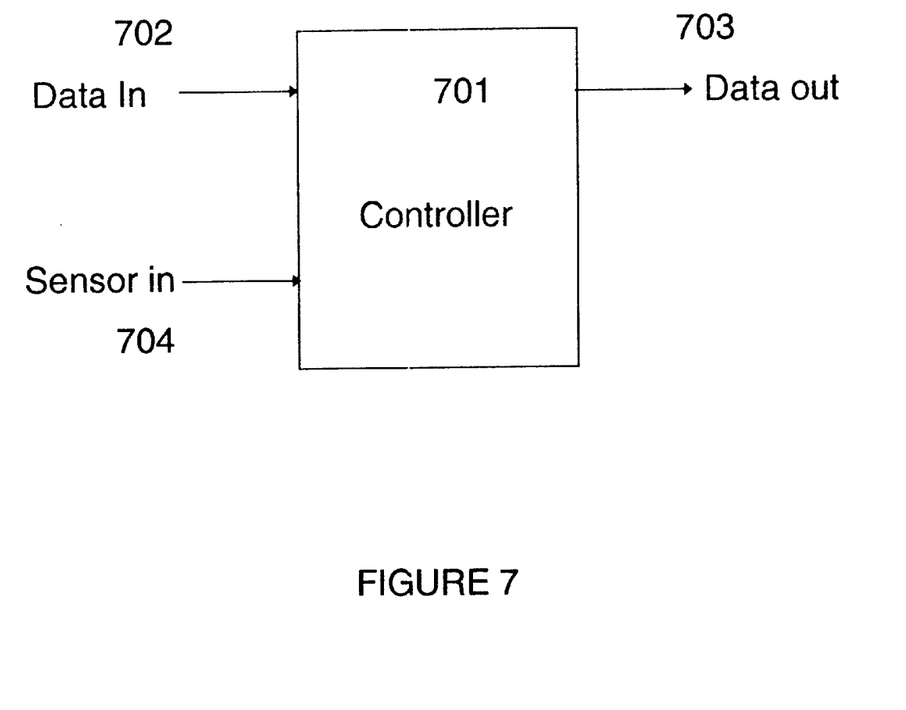
FIG. 7 illustrates a controller module with sensor data inputs and control data inputs and outputs.

FIG. 7 illustrates a controller module 701 having sensor data inputs 704 and control data inputs 702 and outputs 703. Control data inputs 702 entering each controller 701 comprise instructions such as: "reduce power dissipation" (possibly by some percentage), or "increase processing speed." Again, the multiple controller configuration is implemented in data-dependent system configurations based on system performance objectives. Therefore data inputs 702 and outputs 703 are tied to dependent controllers or sub-components in the management system. In reactive systems sensor data inputs 704 can be actual thermal measurements. In a proactive system, however, requirements would be pre-determined (or estimated). The management system then manipulates controllers to meet system requirements.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification. Therefore it is intended that all such modifications and alterations are included insofar as they come within the scope of the appended claims or equivalents thereof.

What is claimed is:

1. A system for dynamically regulating power, comprising:
   more than one controlled component, where power of each said controlled component is dynamically regulated via mechanisms known in the art;
   any number of non-controlled components, where power of said non-controlled components is dynamically predicted;
   a controller, wherein said controller dynamically determines the desired power of each said controlled component to optimize system performance based upon a known power budget, the predicted power of said non-controlled components, and the power and performance tradeoff of said controlled components; and
   a mechanism to communicate the desired power from said controller to each of said controlled components.

2. The system of claim 1, further comprising sensors to dynamically measure the power of said non-controlled components to aid in said prediction of power.

3. The system of claim 1, wherein said controller determines the power and performance tradeoff of said controlled components based upon required temporal ordering of the operations being performed on said controlled components and said non-controlled components.

4. The system of claim 1, wherein said controller determines the power and performance tradeoff of said controlled components based upon computational instructional analysis.

5. The system of claim 1, further comprising:
   a plurality of said systems for dynamically regulating power; and
   a level-wide controller, wherein said level-wide controller dynamically determines the desired power of each said controlled component of each said system for dynamically regulating power to optimize system performance based upon a known power budget and the power and performance tradeoff of each said system for dynamically regulating power.

6. The system of claim 5, wherein said level-wide controller determines the power and performance tradeoff of each said controlled component of each said system for dynamically regulating power based upon required temporal ordering of the operations being performed on said controlled components and said non-controlled components of each said system for dynamically regulating power.

7. The system of claim 5, wherein said level-wide controller determines the power and performance tradeoff of each said controlled component of each said system for dynamically regulating power based upon computational instructional analysis.

8. The system of claim 5, further comprising a plurality of said systems for dynamically regulating power, arranged in a hierarchy, wherein the power budget of each said level-wide controller below the top level of the hierarchy is dynamically determined by said level-wide controller at the next higher level of the hierarchy.

9. The system of claim 8, wherein each said level-wide controller determines the power and performance tradeoff of each said controlled component of said system for dynamically regulating power said level-wide controller is part of based upon computational instructional analysis.

* * * * *